United States Patent

[11] 3,625,339

| [72] | Inventor | Fred T. Smith<br>Aurora, Ill. |
|---|---|---|
| [21] | Appl. No. | 733,648 |
| [22] | Filed | May 31, 1968 |
| [45] | Patented | Dec. 7, 1971 |
| [73] | Assignee | Barber-Greene Company<br>Aurora, Ill. |

[54] REMOVAL AND CONVEYING OF MATERIAL FROM STORAGE PILES OF EXCAVATIONS
32 Claims, 23 Drawing Figs.

[52] U.S. Cl. .................................................. 198/36,
198/109, 214/10
[51] Int. Cl. ...................................................... B65g 65/28
[50] Field of Search............................................ 198/7, 7
BL, 8, 9, 92, 36, 115, 40, 109; 280/150 C, 150.5,
150; 214/10

[56] References Cited
UNITED STATES PATENTS

| 1,474,356 | 11/1923 | French ........................ | 198/7 X |
| 2,655,246 | 10/1953 | Bebinger ..................... | 198/7 |
| 2,670,070 | 2/1954 | Decat........................... | 198/8 |
| 2,851,143 | 9/1958 | Rosetz.......................... | 198/9 |
| 3,298,494 | 1/1967 | Pfeilschifter ................ | 198/9 |
| 1,313,352 | 8/1919 | Stuart........................... | 198/92 UX |
| 3,052,050 | 9/1962 | Wilms et al. ................ | 198/9 X |
| 3,231,064 | 1/1966 | Towles ......................... | 198/92 |
| 3,268,058 | 8/1966 | Buckeridge et al. ......... | 198/92 |
| 3,338,432 | 8/1967 | Ziegenbein.................. | 198/8 X |
| 3,361,248 | 1/1968 | Daymon....................... | 198/92 |
| 99,734 | 2/1970 | Wieland et al............... | 198/40 |
| 2,478,653 | 8/1949 | Callan .......................... | 280/150 |
| 3,289,816 | 12/1966 | Baechli......................... | 198/92 X |

*Primary Examiner*—Richard E. Aegerter
*Assistant Examiner*—Douglas D. Watts
*Attorney*—Hill, Sherman, Meroni, Gross & Simpson ABSTRACT: A material moving machine is operated to loosen and remove material in successive cuts or swaths of predetermined width and substantial length from the face of a material source such as a storage pile or an excavation. A conveyor on the opposite side of the moving machine and receiving the removed material therefrom extends substantially parallel and in spaced relation to the material source face. As the position of the face shifts relative to the conveyor due to removal of successive swaths of material requiring consequential shifting movement of the machine, the conveyor correspondingly moves up to maintain substantially the same spaced relation between the successive positions of the face, the machine and the conveyor to facilitate reception of the material from the machine. The conveyor comprises a plurality of articulated sections connected in end-to-end relation and having a continuous single endless conveyor belt carried by sections, with running wheels supporting the sections and means for driving certain of the wheels to move the conveyor as a unit.

INVENTOR
FRED T. SMITH

INVENTOR
FRED T. SMITH

INVENTOR
FRED T. SMITH

FIG.23

REMOVAL AND CONVEYING OF MATERIAL FROM STORAGE PILES OF EXCAVATIONS

Efficient machines have been devised for loosening and removing material in cuts of substantial depth in swaths from the face of large storage piles of loose material, or similarly, to excavate along a cut such as along or through a hillside or below general terrain level. Handling of the material after it has been loosened and removed by the machine then presents a problem. One method of handling the material is to have suitable bulk handling vehicles move along with the machine to receive the loosened material from a boom conveyor extending from the machine. This is an expensive method of handling large quantities of material because of the large number of vehicles needed, as well as drivers for the vehicles, as well as other costs. Even less economical is the loose piling of the material in windrows which are then scooped up and loaded into transport vehicles.

According to the present invention, the foregoing and other difficulties, disadvantages and inefficiencies of prior practice are effectively overcome by depositing the material onto a conveyor extending substantially parallel to the face of the material source as a material removing machine moves therealong; and progressively shifting the position of the conveyor as successive swaths of material are removed, to maintain an effective operational relationship of the conveyor to the face of the material source and/or a loading conveyor of the machine.

According to important objects of the present invention is the efficient handling of loose material that has been removed from the face of a storage pile or excavation.

Another object of the invention is to provide for the efficient immediate and continuous handling of loose material as it is removed from a material source.

A further object of the invention is to provide a novel conveyor structure cooperatively related to a material moving machine to receive material therefrom and transport it to an unloading point.

Still another object of the invention is to provide a new and improved automotive conveyor constructed and arranged to advance in coordinated relation with a material moving machine toward the face of a material source.

A still further object of the invention is to provide a new and improved conveyor structure for receiving material from a material moving machine operable along the face of a material source and including novel means for guiding the machine in alignment with the conveyor.

Yet another object of the invention is to provide a novel multisection automotive wheeled conveyor with means for maintaining alignment with a fixed receiving conveyor as the wheeled conveyor advances periodically in coordinated relation with advances of an associated material removing machine toward the progressively shifting face of a material source from which the machine removes the material for deposit onto the wheeled conveyor.

It is also an object of the invention to provide a novel automotive wheeled conveyor which is adapted to be driven into operating locations.

Other objects, features and advantages of the present invention will be readily apparent from the following detailed description of certain preferred embodiments thereof taken in conjunction with the accompanying drawings, in which.

Some bulk materials are conveniently stockpiled in storage yards near the production site, at an accumulation point where production may be at different sites, and the like. For example salt, crushed stone, coal, and other bulk materials that may be stored in large piles may be accommodated in this manner. From the storage piles the material is reclaimed as needed.

Sometimes raw materials are accessible in natural stockpiles so that they can be removed by successive passes along an escarpment in much the same manner as reclaiming material from a storage pile. In addition to mining of minerals in this manner, may be mentioned procurement of earth for roadbed fill, land cuts, cutting back banks, etc., in highway construction.

Mining of minerals and earth removal may also be effected by trenching techniques where the material is excavated in successive passes along the face of a trench or at least from overhead with the excavating equipment on the bank alongside the excavation.

Figure 1:
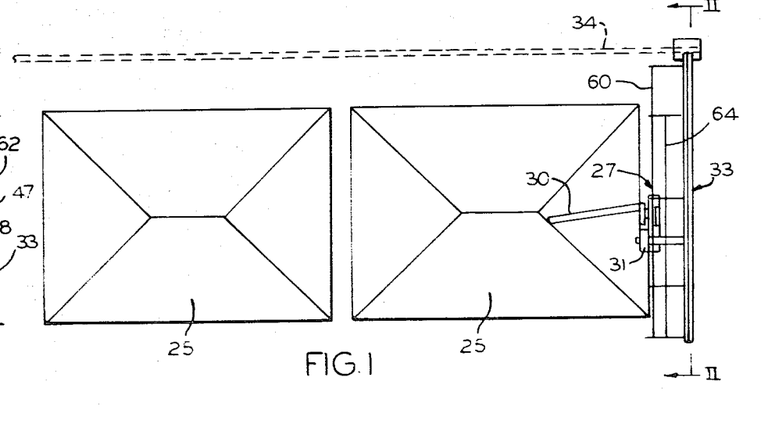
FIG. 1 is a schematic plan view of a material moving machine and conveyor according to the present invention employed in removing materials from storage piles.
Figures 2, 4:
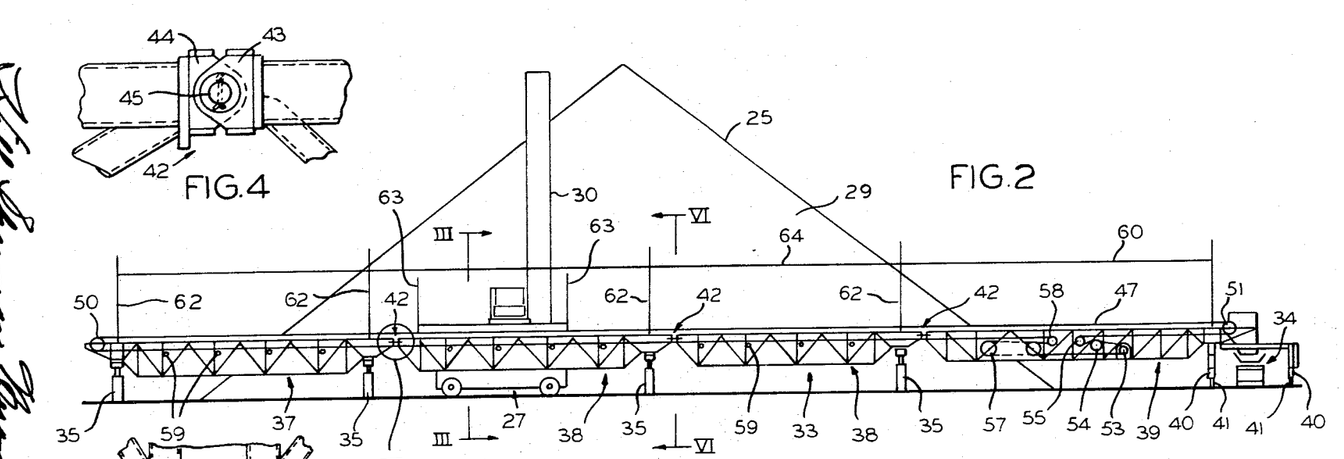
FIG. 2 is an enlarged schematic elevational view taken substantially along the line II—II of FIG. 1.
FIG. 4 is an enlarged elevational detail view of one of the couplings between sections of the conveyor taken substantially at the encircled area IV of FIG. 2.
Figures 3, 5:
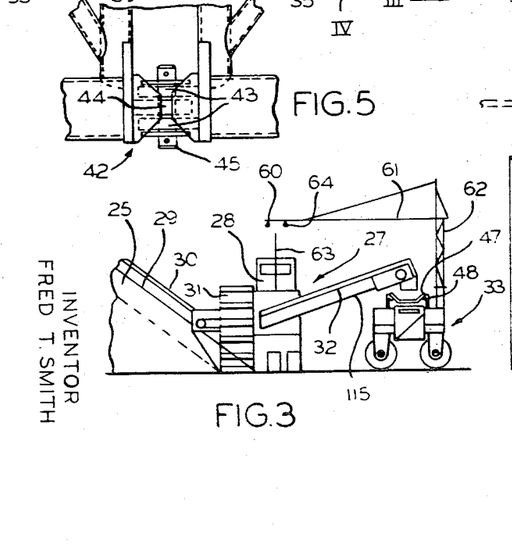
FIG. 3 is a sectional elevational view taken substantially along the line III—III of FIG. 2.
FIG. 5 is a top plan view of the coupling of FIG. 4.

Principles of the present invention are applicable in the handling of bulk materials under the several conditions and operations just enumerated, as well as others that may suggest themselves or may be found and to which the invention is applicable, but for illustrative purposes the invention will be described herein with respect to reclaiming of bulk material from storage piles 25 (FIGS. 1-3). Schematically shown is an automotive machine 27, commonly referred to as a reclaimer and which is under the control of an operator within a cab 28. This machine is constructed and arranged to be run along a face 29 of the selected pile 25 to cut a layer or swath of substantial depth along the face of the pile as by means of a boom device 30 projecting from the side of the machine nearest the face 29. As the material dislodged by the boom device descends, it is gathered up by a loading wheel 31 which deposits it on a loading boom conveyor 32 which projects a suitable distance from the opposite side of the machine and discharges the material at a suitable height to be received in a conveyance for transportation away from the pile.

Maximum efficiency in handling of the material removed from the selected storage pile 25 is attained by having the boom conveyor 32 discharge onto a conveyor 33 which extends parallel to the face 29 and is at least as long as and desirably substantially longer than the width of the pile so that throughout the reclaiming swath movement of the reclaimer 27 the boom conveyor can discharge continuously onto the conveyor 33 which transports the material to one end thereof and there discharges it onto a storage yard conveyor 34 which extends in a path normal to the length of the conveyor 33 and carries the material to a dockside, loading hopper bins or silos, and the like for loading into suitable conveyances such as ships, unit trains, trucks, and the like.

To enable the conveyor 33 to be moved relative to the face 29 of the storage pile in order to maintain the conveyor in substantially same spaced relation to such face for each successive swath removal whereby to maintain alignment with the discharge end of the loading boom conveyor 32, the conveyor 33 is mounted on wheels 35 (FIGS. 2 and 6) located at suitable intervals along its length. Desirably the wheels are located adjacent to the ends of respective articulated sections of the conveyor, enabling the conveyor to accommodate to variations in ground level along its length without strain. Further, the sectional construction of the conveyor is desirably such that the length of the conveyor may be readily increased or decreased as desirable for the conditions and requirements in use. For this purpose, the conveyor 33 may be made up of a tail end frame section 37, one or more similar intermediate frame sections 38 and a discharge end frame section 39. Each of the several sections comprises a self-contained elongated frame unit in which the tail end section 37 desirably has a set of the running wheels 35 adjacent to each of its opposite ends while the intermediate section or sections 38 each has a set of the wheels 35 at one of its ends, while the discharge end section 39 may be provided with respective spaced sets of supporting wheels 40 running on tracks 41 which flank the conveyor 34 (FIG. 2).

Flexible couplings 42 (FIGS. 2, 4 and 5) connect the several conveyor sections 37 and 38 and 39 together in end to end relation in a manner to maintain the sections against any substantial misalignment horizontally while permitting vertical movements at the joints as may be occasioned by differences in the ground level encountered by any of the successive sets of ground running wheels 35. In a desirable form, the couplings comprise a pair of adjacent spaced hinge ears 43 rigid on each side of one end of one of the coupled conveyor section frames in vertical planes and with a complementary hinge ear extending from the confronting end of the connected conveyor frame, with a connecting pin 45 secured through the interleaved ears. Thereby since the conveyor sections are coupled at each side of each of the joints therebetween by means of the pivotal couplings 42, effective retention of the coupled conveyor sections against horizontal alignment is provided for, while articulation about the axes of the connecting pins 45 enables vertical adjustments to accommodate irregularities in ground level. Quick connection or disconnection is also enabled by the ear and pin couplings.

By having the several frame sections of the conveyor 33 positively held against any substantial horizontal misalignment, a single endless conveyor belt 47 extending the full length of the conveyor may be used, as shown. To this end, throughout an upper transporting run, the endless flexible conveyor belt 47 is supported generally trough shaped on suitable cradling supports 48 (FIGS. 3 and 6) mounted on the conveyor frames and having antifriction supporting rollers 49 on which the transporting run of the belt travels. At the tail end of the tail section 37 of the conveyor assembly the conveyor belt runs over an idler return pulley 50 while at the discharge end of the conveyor the belt runs over an idler roller 51 to return longitudinally through the conveyor frame under a protective deck 52. Means for driving the conveyor belt 47 comprise a motor 53 mounted on the frame of the conveyor section 39 and driving a roller 64 over which the belt is threaded from an idler roller 55 and from which it runs to and over a belt tightening and pickup roller 57 and thence over an idler roller 58 from which it continues its return travel. At suitable intervals supporting idler rollers 59 on the conveyor frame support the return run of the belt 47.

In order to enable the operator of the machine 27 to guide the machine in a parallel path along the conveyor 33 for maintaining the discharge end of the loading boom conveyor 32 properly aligned with the conveyor belt 47, suitable guide means are provided which may comprise automatic electric eye or other electrical or electronic guiding system but in a simple, visual arrangement comprises an overhead guide line 60 supported from cantilever arms 61 extending from respective masts 62 mounted at suitable intervals on the conveyor frame. Adjacent to each opposite end of the body of the machine 27 and spaced from the cab 28 is a vertical sighting rod 63, while moving in a cutting swath along the storage pile the sighting rod 63 on the front end of the machine is maintained in sight alignment with guide cord 60 by the operator of the machine. When the machine 27 is run in reverse to traverse to the opposite end of the conveyor, it is backed off from the face 29 of the pile and in order to maintain a proper distance from the conveyor to avoid collision, the operator maintains the sighting rod 63 on the rear end portion of the machine aligned with a traverse guide line 64 also supported by the cantilever arms 61 spaced horizontally a suitable distance from the overhead guide line 60.

After the machine 27 has completed cutting a swath from the storage pile, it is returned in a traversing run toward the opposite end of the conveyor 33, using the sighting line 64, and the machine is then repositioned with respect to the pile to cut a succeeding swath of material therefrom to be loaded onto the conveyor. As the machine assumes the new cutting position, the conveyor 33 is advanced a coordinated distance toward the face 29 of the pile so as to position the conveyor belt 47 in proper alignment with the discharge end of the loading boom 32 of the machine. Such repositioning of the conveyor may be effected automatically in response to a signal by or from the machine 27 or the operator of the machine and activates for the proper duration suitable driving means on or in association with the conveyor 33. Such driving means is also operable to run the conveyor 33 into any position desired along the track provided by the rails 41. A practical automotive system for the conveyor will be described more fully hereinafter.

Figure 7:
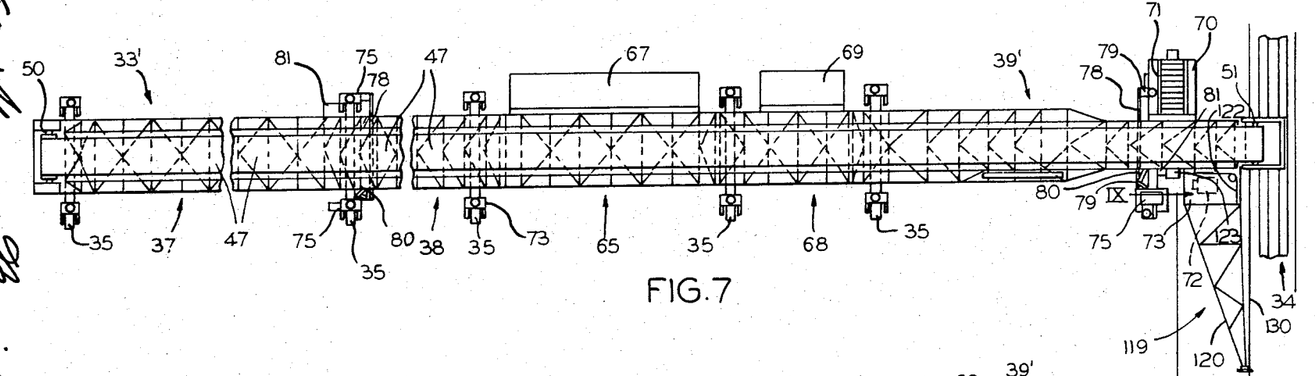
FIG. 7 is a fragmental schematic top plan view of a modified form of the automotive conveyor.
Figure 8:
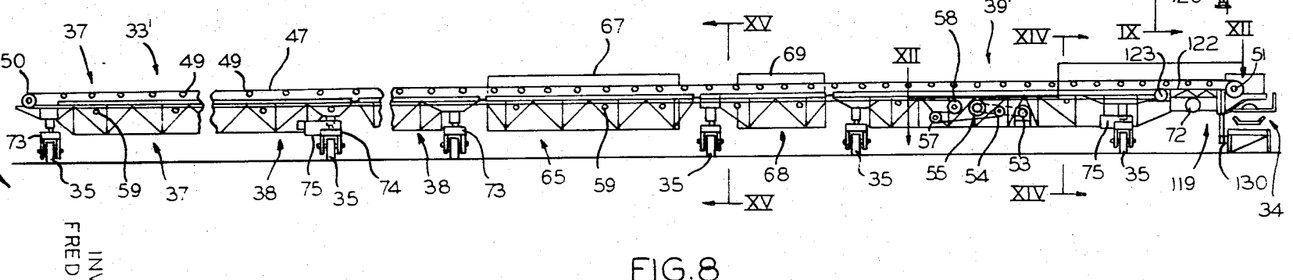
FIG. 8 is a side elevational view of the conveyor of FIG. 7.

For use under conditions where it may be desirable to transport the material moving machine following conveyor from place to place in a bulk storage facility or excavating operation, the arrangement as provided by the conveyor 33' shown in FIGS. 7 and 8 may be used. In this modification of the conveyor, substantially the same sort of coupled sectional units is employed as in the conveyor 33 comprising a tail end section unit 37 supported at its opposite end portions by respective sets of running wheels 35, as many as needed of intermediate frame section units 38 and an unloading end section 39' desirably provided with the sets of running wheels 35 adjacent to its respective opposite ends so as to be independent of the fixed transverse conveyor 34. In addition, the conveyor 33' desirably has operating apparatus sections therein comprising, for example, a frame section 65 having on its side a platform 67 for supporting apparatus such as hydraulic and electrical equipment. The section 65 may be coupled to and between one of the intermediate sections 37, and a wheeled section 68 which is in turn coupled to the unloading support apparatus such as diesel generator and various other control apparatus. In addition, the conveyor section 39' may have at one side a platform 70 carrying a power cable reel 71 where the conveyor is to be operated from a power source remote from the conveyor and to which the electrical operating and control circuit may be connected for operation by a cable drawn from the reel. To facilitate connecting power with the other section or sections of the conveyor on which electrical operating and control means are carried, an electrical control cable may be carried on a reel 72 under a platform 73 carried by the front end portion of the conveyor section 39' on the opposite side from the platform 70.

Figure 6:
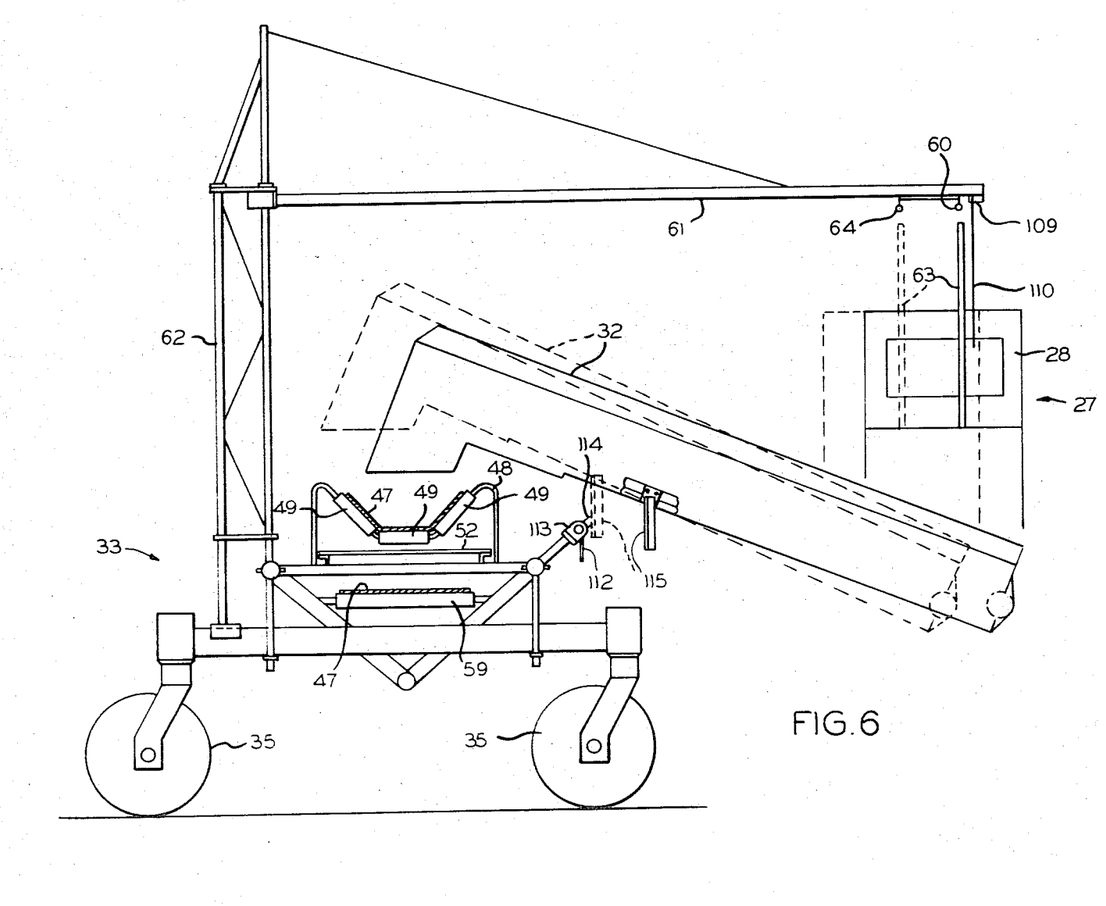
FIG. 6 is a substantially enlarged, sectional elevational and schematic illustration taken substantially along the line VI—VI of FIG. 2.
Figure 15:
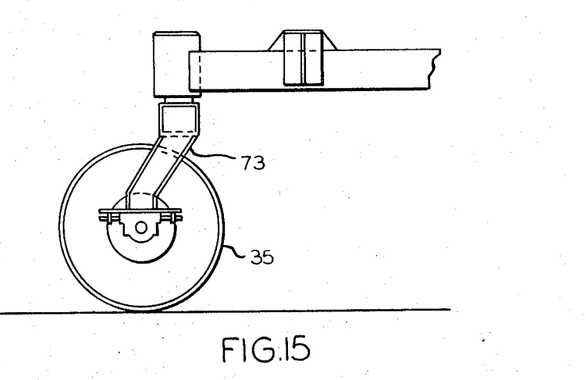
FIG. 15 is a fragmentary enlarged schematic detail view taken substantially along the line XV—XV of FIG. 8.
Figure 16:
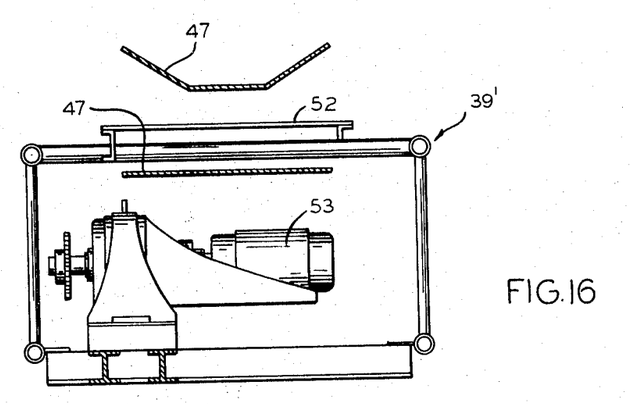
FIG. 16 is an enlarged schematic sectional detail view taken substantially along the line XVI—XVI of FIG. 13.
Figure 17:
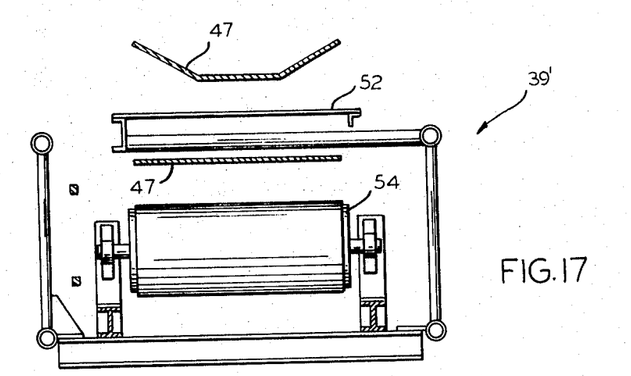
FIG. 17 is an enlarged schematic sectional elevational detail view taken substantially along the line XVII—XVII of FIG. 13.
Figure 18:
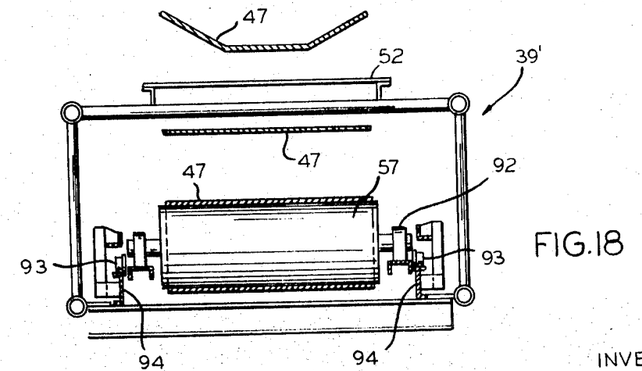
FIG. 18 is an enlarged sectional schematic elevational detail view taken substantially along the line XVIII—XVIII of FIG. 13.

While most of the running wheels 35 of the conveyor 33' are free running, as is also true of the conveyor 33, certain of the wheels are arranged to be driven to effect advancing or transporting movement of the conveyor. For this purpose, the larger number of the wheels 35 are attached in supporting relation to the frame structure of the conveyor by means of respective swivel frames 73 so that they will operate as casters (FIGS. 6, 7 and 15). Certain other of the wheels 35 are attached to the associated portions of the conveyor frame structure by means of steerable pivot frames 74. As shown in FIGS. 7 and 8, one set of the steerable driven wheels is located in support of the rearmost of the intermediate conveyor sections 38, and another set of the steerable driven wheels is located in supporting relation to the front end portion of the conveyor section 39', that is the set of conveyor wheels nearest the transverse conveyor 34. Since the several conveyor sections are all coupled together, driving of the driven and steerable wheels will effect movement of the conveyor assembly in a selected direction, with the caster wheels following along.

For driving the driven wheel assemblies, each of them is desirably provided with a suitable drive motor and gear reduction assembly 75 mounted on the respective swivel frames 74, with a flexible drive, such as a chain drive 77 operatively connecting the driving means with the respective wheel.

For steering, means are provided connecting each of the pair of driven and steerable wheels in each set as by means of a steering link 78 pivotally attached at its respective opposite ends to respective steering arms 79 on the frames 74. Steering control is effected through means comprising a hydraulic piston and cylinder actuator 80 attached in each instance to one of the steering arms 79 at one end and to the conveyor frame at its opposite end.

Figure 14:
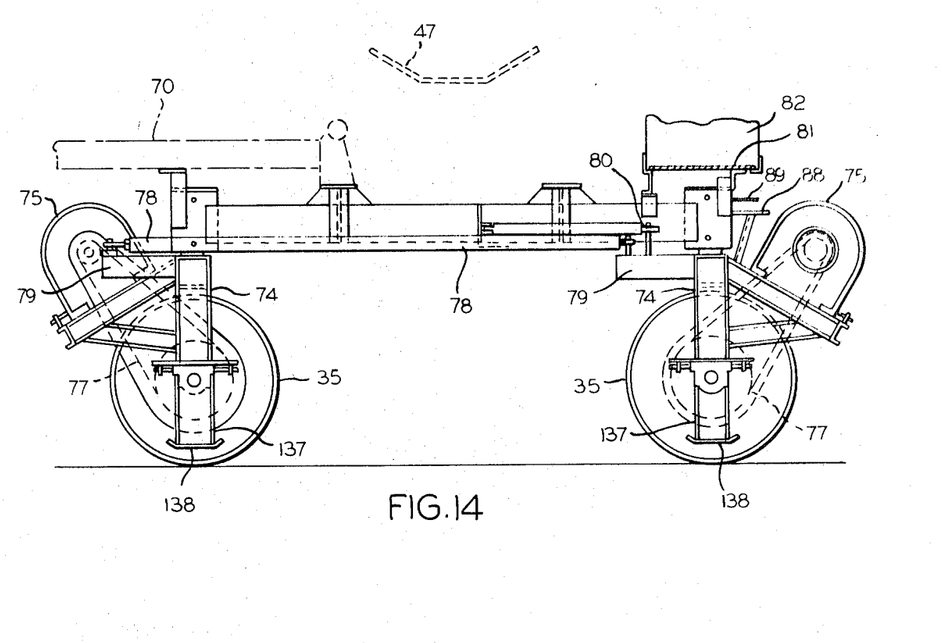
FIG. 14 is an enlarged schematic detailed view taken substantially along the line XIV—XIV of FIG. 8.
Figure 21:
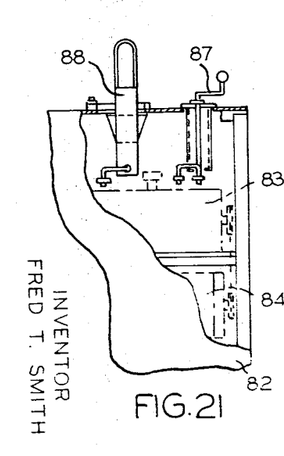
FIG. 21 is a side elevational view of the operator's platform.

Steering control is effected hydraulically through the actuators 80 by one or more attendants or operators manipulating suitable controls carried on respective platforms 81 on the conveyor frame adjacent to the actuators. On each of these platforms is a control cabinet 82 (FIGS. 14, 20 and 21) having therein a pump 83 driven by an electrical motor 84 and with a three-way control valve (FIGS. 19 and 20) operative to control the hydraulic circuit for the actuator 80. Normally the valve 85 is biased to a neutral position wherein the actuator 80 serves to hold the set of wheels controlled thereby in whatever steering attitude may be intended. On the top of the cabinet 82 is provided a hand lever 86 which is adapted to be manipulated for operating the valve 85 to turn the steerable wheels through a 90° range between a running direction normal to the axis of the conveyor to a running direction longitudinally parallel with the axis, and any direction in between. To ascertain visually the running attitude of the steerable wheels, means are desirably provided such as an indexed plate 88 carried by the wheel frames 74 of the wheels nearest the control platform 81 and movable arcuately with the wheel frame, and with an index marker or pointer 89 carried stationary on the conveyor frame in indexing relation to the index plate.

Figure 12:
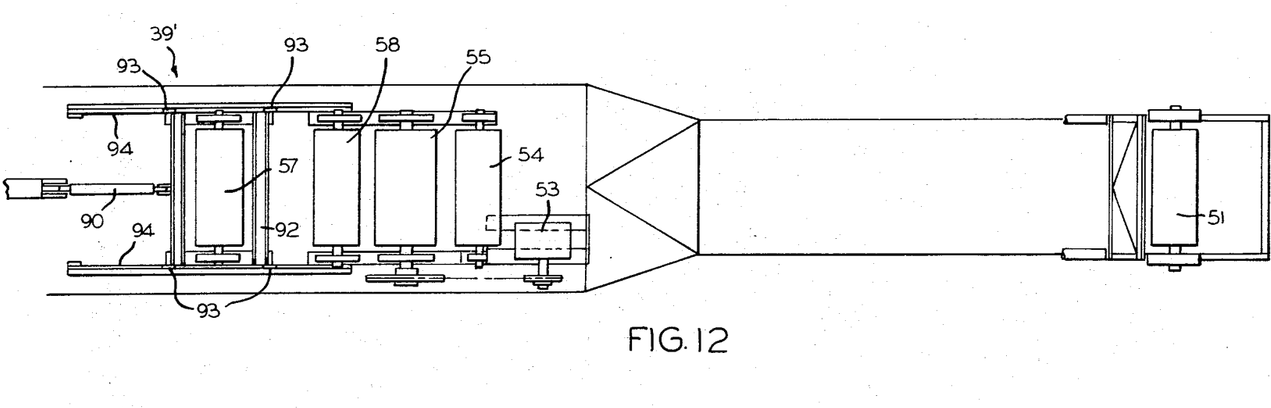
FIG. 12 is an enlarged schematic plan view taken substantially along the line XII—XII of FIG. 8.
Figure 13:
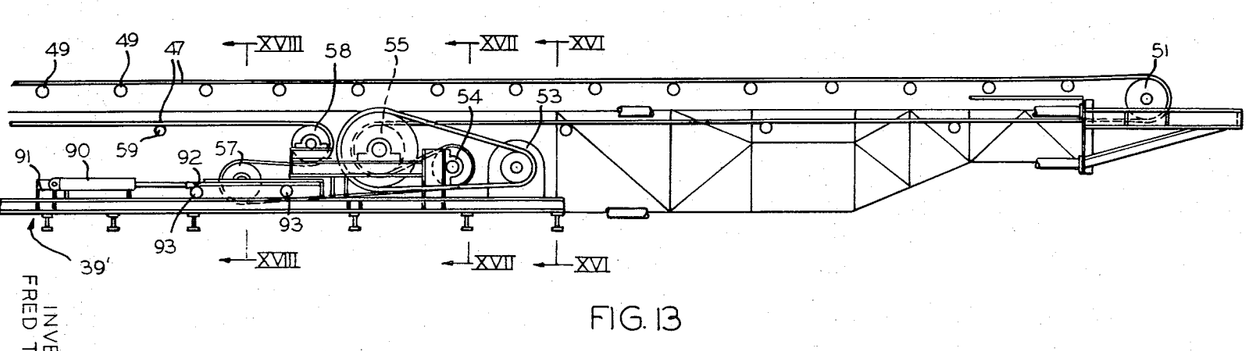
FIG. 13 is a side elevational schematic view of the structure shown in FIG. 12.
Figures 19, 20:
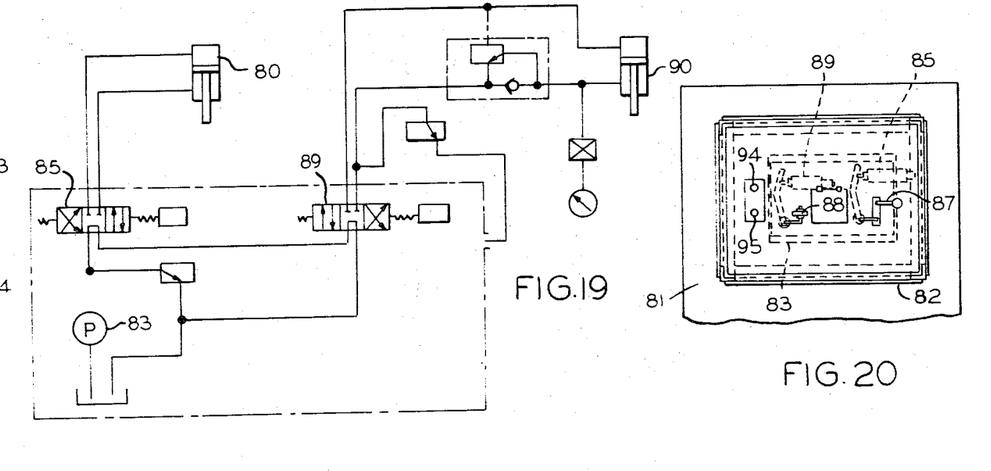
FIG. 19 is a hydraulic circuitry diagram relating to the steering and belt tightening apparatus of the conveyor.
FIG. 20 is a top plan view of one of the operator's platforms of the conveyor.

In addition to steering control, at least the cabinet 82 located adjacent to the discharge end of the conveyor assembly may be provided with a means for hydraulically controlling the belt-tightening roller 57. To this end, a hand lever 88 accessible on the top of the cabinet is operable to control a three-way normally neutrally biased control valve 89 in a circuit also supplied by the pump 83 for a belt-tightening or takeup piston and cylinder hydraulic actuator 90 (FIGS. 12, 13 and 19). At one end the actuator 90 is pivotally attached to an anchor block 91 fixed on the frame of the conveyor section 39'. At its opposite end the actuator is pivotally attached to a dolly 92 which supports the belt takeup roller 57. This dolly rides on wheels 93 running on rails 94. When the conveyor belt is to be tightened, the actuator is contracted as shown in FIG. 12 and pulls the tightening dolly 92 away from the bank of conveyor belt rolls with which the takeup roll 57 is associated.

Figure 23:
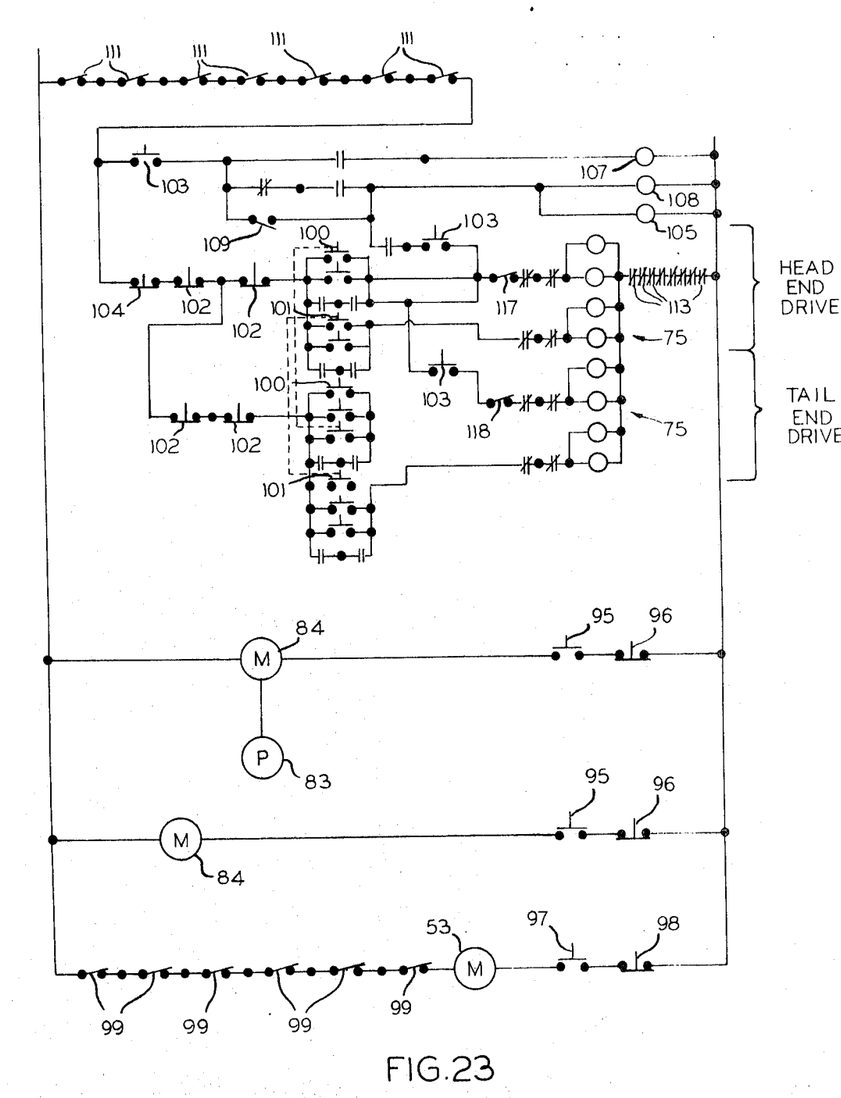
FIG. 23 is an electrical diagram relating to the driving and step-by-step advance of the conveyor.

Electrical control of the motor 84 is effected through a starting switch 95 (FIGS. 20 and 23) and a stop switch 96. Desirably each of the sets of driving wheels is provided with an independent steering control system housed in and on the respective cabinet 82, and in transporting running of the conveyor two attendants or operators, one at each of the cabinets, will be in charge of driving the conveyor, especially where the conveyor is of substantial length. In a shorter conveyor, the dual controls may be integrated for operation from either of the control station cabinets 82 selectively.

Operation of the belt-driving motor 53 (FIGS. 2, 8, 16 and 23) is through suitable electrical circuitry including a starting master switch 97 and a stop switch 98, located at any desirable place on the conveyor assembly. In addition, suitable safety switches 99 may be located at various places along the length of the conveyor to open the belt-driving motor circuit and stop the conveyor belt for emergency purposes such as any detected malfunction. In one desirable manner of operating the safety switches 99, a pull cord or a series of pull cords may be located along the conveyor and conveniently located for emergency actuation.

Operation of the drive wheel motors 75 is adapted to be effected manually, as when the conveyor is to be transported from one location to another, and more or less automatically to advance the conveyor transversely for operative alignment with the material moving machine 27 with which associated. As shown in the electrical diagram in FIG. 23, operation of the motors 75 at will by operators located at the respective control stations on the respective opposite end portions of the conveyor is adapted to be effected by closing respective switches 100 to motivate the reversible drive motors in a forward direction or by closing respective switches 101 for operating the motors to drive the wheels in a reverse direction. Suitable normally closed stop switches 102 are adapted to be opened to stop the drive motors.

When the conveyor is to be advanced periodically and in correlation with the material moving machine to maintain alignment therewith in each material moving swath along the material source, a timer circuit is provided for automatically advancing the conveyor a predetermined distance and then stopping the same, by appropriate control of the motors 75. To this end, a set of normally open switches 103 is closed, and a normally closed switch 104 is opened, whereby the motors 75 are placed under the control of a starting timer 105, a stopping timer 107 and a locking relay 108 which remain inactive until a limit switch 109 is closed to complete the timer circuit. Location of the limit switch 109 is such that when the material moving machine 27 has completed a material cutting and removing swath, the switch is either automatically closed or is closed by the operator of the machine, as by pulling a cord 110 (FIG. 6). Closing of the switch 109 activates the locking relay 108 to complete a circuit through the timer 105 which runs for a set time interval calculated to enable the machine 27 to return to starting position ready to remove another swath of material from the source. The timer 105 then operates to close the circuit through the motors 75 which operate the drive wheels to advance the conveyor. At the same time the timer 105 closes the circuit through the timer 107 which operates a predetermined distance into alignment with the discharge conveyor of the machine. The timer 107 then opens the circuit to the timer 105 and thereby opens the circuit to the drive motors 75. Since automatic advancing operation of the conveyor does not require control by an attendant, emergency stopping switches 111 which may have pull cords 112 (FIG. 6) attached thereto are desirably located at various points along the conveyor to be manually operated to break the motor circuits in the event of a malfunction, necessity for premature stopping machine 27, or the like. In addition, suitable normally closed switches 113 (FIGS. 6 and 23) may be located at intervals along the side of the conveyor nearest the machine 27 and provided with respective switch arms 114 projecting outwardly so as to be engaged by an actuator arm 115 on the conveyor 32 of the machine to stop the drive motors 75 should the timing sequence in the return run of the machine 27 and advance of the conveyor by improperly coordinated or out of step or because of an inadvertent slow down or delay in the traversing or return run of the machine.

Figure 9:
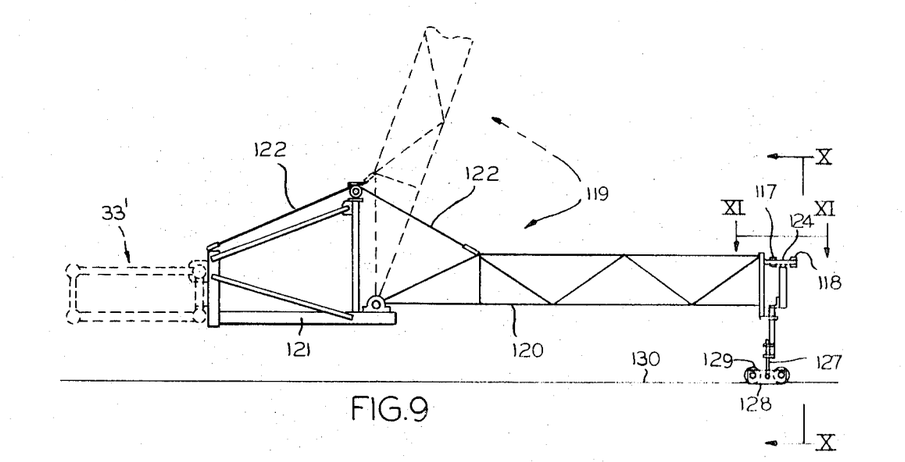
FIG. 9 is an enlarged sectional elevational detail view taken substantially along the line IX—IX of FIG. 7.
Figures 10, 11:
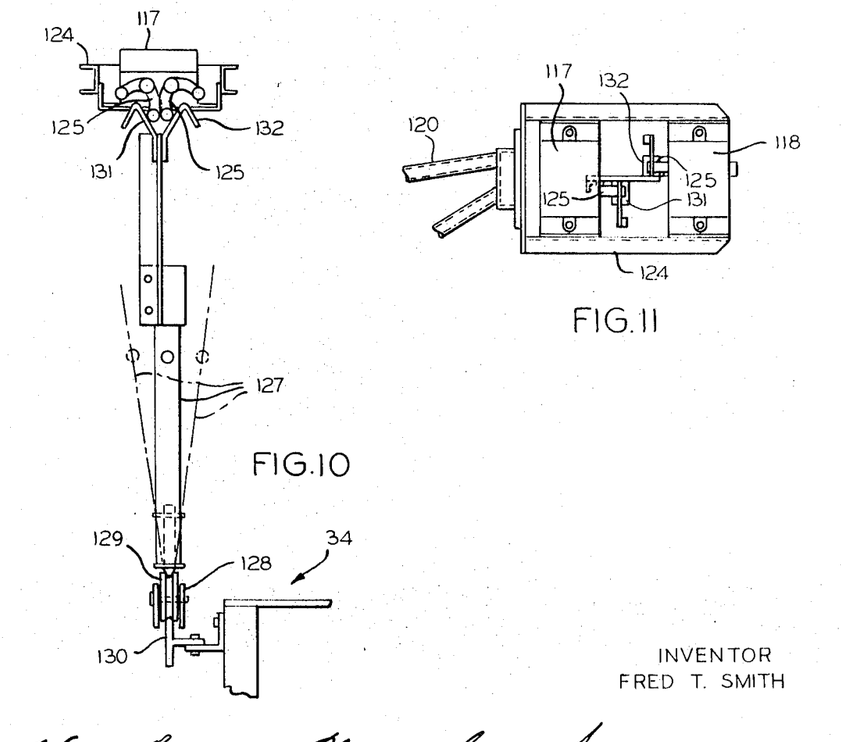
FIG. 10 is an end elevational and sectional detail view taken substantially along the line X—X of FIG. 9.
FIG. 11 is a top plan view taken substantially along the line XI—XI of FIG. 9.

Because of the length of the conveyor 33' and the substantial distance between the drive wheels arranged to be motivated by the motors 75, means are desirably provided for equalizing advancing drive of the wheels to maintain substantially accurate normal alignment of the conveyor with the transverse conveyor 34. Herein such means are of a nature to control the head end and tail end wheel driving motors 75 separately and alternatively as required by detecting and signaling deviations from normal relationship of the conveyor axes during advance of the conveyor 33'. For this purpose, normally closed tracking switches 117 and 118 are in the head end drive and tail end drive motor circuits, respectively, (FIG. 23) and are mounted on a control boom 119 (FIGS. 7-11) mounted on the front end portion of the head end section 39' as a sideward outrigger and arranged to operatively associate with the conveyor 34. Conveniently, the boom 119 comprises a cantilever frame 120 which is pivotally mounted on a supporting frame 121 fixedly secured to the side of the frame of the conveyor section 39'. During conveyor controlling operation, the boom is lowered as shown in full outline, and during transporting of the conveyor 33' from one location to another, the boom is raised as shown in dash outline in FIG. 9, by means of a wire rope cable 122 adapted to be operated by means such as a winch 123 (FIGS. 7 and 8).

Mounting of the switches 117 and 118 is on a downwardly opening supporting bracket frame 124, with the switches spaced apart so that respective switch arms 125 depend in the gap between the switches.

For sensing deviations from a right angular relationship of the conveyor and operating the appropriate switch 117 or 118, an upright sensing lever 127 is intermediately pivoted on the lower free end portion of the boom frame 120. On its lower end the sensing lever carries a trolley 128 having grooved wheels 129 which ride a rail 130 mounted on and extending longitudinally parallel with the conveyor 34. As long as the conveyor 33' advances with its axis normal to the conveyor 34, the sensing lever 127 maintains a neutral position, shown in full line in FIG. 10. If the tail end portion of the conveyor 33' lags behind the head or discharge end of the conveyor, so that the boom 119 swings toward the conveyor 34, the sensing arm 127 swings about its pivot such that the upper end portion thereof also swings toward the conveyor 34 as shown in dot-dash outline, such that a trip arm 131 on its upper end is caused to swing the actuating arm 125 of the switch 117 to stop the forward drive of the head end motors 75, while the tail end drive motors continue advancing drive of the associated wheels until the axis of the conveyor 33' has again assumed a normal relation to the axis of the conveyor 34 whereupon the switch 117 is released to close and the head end drive motors continue driving the conveyor in its advance together with the tail end motors. Conversely, should the head end portion of the conveyor 34 causing the sensing lever 127 to swing about its pivot such that the upper end portion thereof deviates away from the conveyor 34, causing a trip arm 132 on the upper end of the lever to actuate the arm 125 of the switch 118 which is thus opened and stops the head end drive motors until the normal relationship of the conveyor 33' is resumed relative to the conveyor 34 and the switch 118 permitted to close so that the head end motors resume driving of the head end drive wheels, assuming that further advance of the conveyor is required to bring it into proper operating alignment with the material moving machine with which associated.

Figure 22:
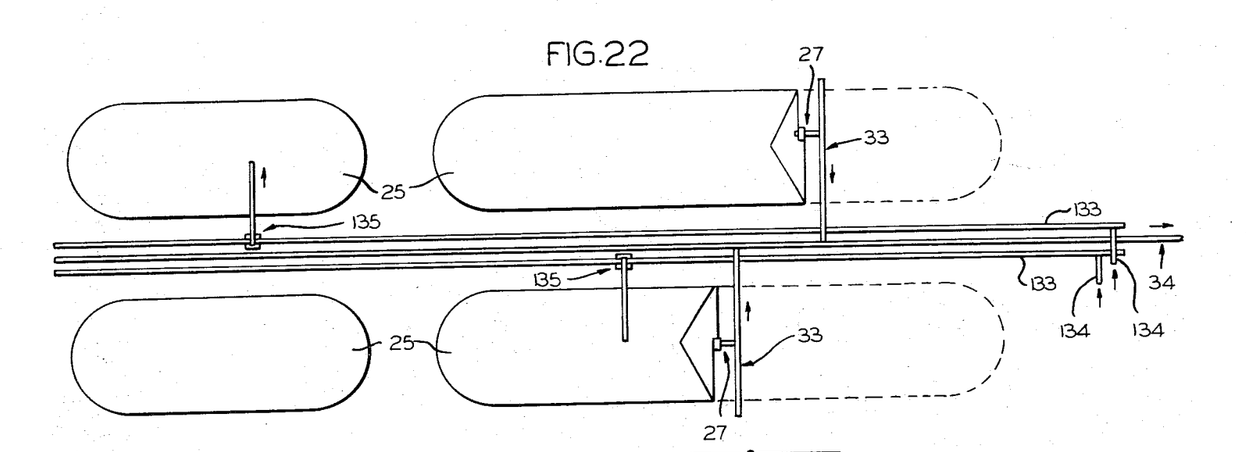
FIG. 22 is a schematic plan view of a material stockpiling system embodying features of the invention.

In large storage yard installations, where storage piles are replenished with some regularity and material reclaimed from the storage piles also with some regularity, a plurality of the conveyors 33 (and including, if desired, features of the conveyor 33') may be associated with one of the conveyor 34, as shown in FIG. 22. In such an installation it may be convenient to provide stocking conveyor 133 parallel with the conveyor 34 and with shuttle conveyors 134 respectively delivering to the stocking conveyors. Associated with the stocking conveyors are respective stacking machines 135 which receive the material from the stocking conveyors and deliver it by way of stacking conveyors to the respective piles 25.

In order to avoid dropping, of at least the head end of the conveyor 33' below a safe level should the preferably pneumatically tired wheels deflate, safety deflation support means are provided. For example, on the frames 74 of the head end driving wheels 35 are mounted depending legs 137 (FIG. 14) having lower end resting pads or feet 138. When the tires of the associated wheels are fully inflated the feet 138 are spaced above ground level. Upon preferably even partial deflation the feet engage the ground and support at least the head end of the conveyor against further descent. This prevents the discharge end means of the conveyor section 39' from contacting and possibly damaging the conveyor belt of the conveyor 34.

It will be understood that variations and modifications may be effected without departing from the spirit and scope of the novel concepts of this invention.

I claim as my invention:

1. A method of moving loose material by means of an elongated, automotive, end discharge conveyor assembly including running wheels and a longitudinal endless conveyor on which loose material is adapted to be deposited from an automotive ground running machine having at one side thereof material dislodging device operatively aligned with a loading boom conveyor having a discharge end at the opposite side of the machine, comprising:

locating said machine with its dislodging device in material dislodging relation to a material source;

locating said conveyor assembly in spaced relation to the material source with said machine therebetween and with said endless conveyor receptively aligned with said discharge end;

running said machine between a starting end and a terminal end of a path between said source and generally parallel to said assembly while continuously removing material from said source and discharging said material from said end onto said endless conveyor;

at the terminal end of said path moving said machine transversely relative to said source and to said conveyor assembly and thereby clearing said dislodging device from said source;

then running said machine to said starting end while said conveyor assembly remains in stationary position;

at said starting end moving said machine transversely relative to said conveyor and returning said dislodging device into material removing relation to said source; and running said assembly transversely relative to said machine and to said source sufficiently to effect realignment of said endless conveyor with said discharge end.

2. A method according to claim 1, including sensing and transmitting to control means for running gear including said wheels of said assembly information that the machine has reached said terminal end, and timing said control means to effect said running of the assembly after said machine has been moved to return said dislodging device into material-removing relation to said source.

3. A method according to claim 1, including positively guiding said machine while running between said starting end and said terminal end of the path to remain in parallel running relation to said conveyor assembly so as to assure discharging alignment of said discharge end with said endless conveyor although the conveyor assembly and the machine are not physically connected together.

4. A method according to claim 1, wherein said moving of the machine transversely relative to said material source at the terminal end of said path comprises shifting of the machine toward said conveyor assembly, and including guiding said machine during running thereof to said starting end to avoid deviation from the parallel path whereby to prevent collision with said conveyor assembly.

5. A method according to claim 1, including aligning the discharge end of the conveyor assembly with a transporting conveyor running in a direction transverse to the length of said conveyor assembly, during said running of the conveyor assembly transversely relative to said machine and to said source sensing any deviation from normal angular relation of said conveyor assembly to said transporting conveyor, and moving said conveyor assembly to eliminate the deviation.

6. A method according to claim 5, in which said conveyor assembly must be operatively located at right angles to the length of the transporting conveyor, and advancing whichever end of the conveyor assembly lags behind the other end to eliminate deviation from the right angular relationship while running the conveyor assembly transversely relative to the machine and to the source.

7. In combination in apparatus for moving loose material:
an elongated, automotive, end discharge conveyor assembly including running wheels and a longitudinal endless conveyor on which loose material is adapted to be moved toward the discharge end, and the conveyor assembly located in spaced relation to a material source to receive material therefrom;
an automotive ground running machine having at one side thereof material dislodging device operatively aligned with a loading boom conveyor having a discharge end at the opposite side of the machine, and said machine being located between said source and said conveyor with said discharge end adapted to be aligned with said endless conveyor by running said machine between a starting end and a terminal end of a path generally parallel to said conveyor assembly while said device continuously removes material from said source;
said machine being operable to move transversely relative to said source and to said conveyor assembly at the terminal end of said path to clear said dislodging device from said source, and being then operable to run to said starting end while said conveyor assembly remains in stationary position, so that at said starting end the machine can move transversely relative to the conveyor assembly and return said dislodging device into material-removing relation to said source; and
means operable to effect running of said conveyor assembly transversely relative to said machine and to said source sufficiently to effect realignment of said endless conveyor with said discharge end.

8. Apparatus according to claim 7, including control means for running gear of said conveyor assembly including said wheels and sensing means for transmitting to said control means information that the machine has reached said terminal end, and means for timing said control means to effect said running of the conveyor assembly after said machine has moved at said starting end of the path to return said dislodging device into material-removing relation to said source.

9. Apparatus according to claim 7, including means for guiding said machine to run parallel with said conveyor assembly so that said discharge end will remain aligned with said endless conveyor while the machine is running along said path from said starting end to said terminal end, even though the machine is not physically connected with said conveyor assembly.

10. Apparatus according to claim 7, including means for guiding said machine in returning from said terminal end to said starting end of the path whereby to avoid collision of the machine with the conveyor assembly.

11. Apparatus according to claim 7, including a transporting conveyor extending transversely to said conveyor assembly and located to receive material discharged by said endless conveyor at said discharge end of the conveyor assembly, and means for maintaining predetermined angular orientation of said conveyor assembly to said transporting conveyor during movements of the conveyor assembly transversely relative to said machine and said source.

12. Apparatus according to claim 11, wherein said conveyor assembly is located at right angles to said transporting conveyor, including means operative to effect advance of either end of said conveyor assembly that lags relative to the opposite end during said transverse running movement of the conveyor assembly.

13. Apparatus according to claim 7, wherein said means for effecting running of said conveyor assembly comprise electrical means, electrical timing means for coordinating said movement of the conveyor assembly with movements of said machine, and means for sensing arrival of said machine at said terminal end of said path.

14. Apparatus according to claim 7, including means on said machine and on said conveyor assembly relatively unconnected but operable in alignment to determine proper alignment of the machine with the conveyor assembly.

15. Apparatus according to claim 14, said means for determining proper alignment comprising a sighting device carried by the machine and a visually observeable guide line carried by the conveyor assembly.

16. Apparatus according to claim 7, wherein said means for effecting running of said conveyor assembly comprise electrical means, electrical timing means for coordinating said movement of the conveyor assembly with movements of said machine, and means operable incident to arrival of the machine at said terminal end for initiating operation of said timing means.

17. Apparatus according to claim 7, wherein said means for effecting running of said conveyor assembly comprise electrical means, electrical timing means for coordinating said movement of the conveyor assembly with movements of said machine, and means on said machine and on said conveyor assembly for controlling said timing means against enabling premature running of said conveyor assembly while said machine is running to said starting end.

18. In apparatus of the character described:
a conveyor comprising a plurality of sections connected in end-to-end relation;
an endless conveyor belt system carried by said sections;
running wheels supporting said sections;
means for driving certain of said wheels to move the conveyor as a unit; and
sighting line masts supported by said conveyor sections and having cantilever arms supporting sighting line means for maintaining alignment of a material loading machine running parallel with the conveyor.

19. In apparatus of the character described:
a conveyor comprising a plurality of sections connected in end-to-end relation;
an endless conveyor belt system carried by said sections;
running wheels supporting said sections;
means for driving certain of said wheels to move the conveyor as a unit;
said belt system discharging at one end of the conveyor;
means on said one end of the conveyor for running the conveyor in squared up normal discharging relation to a transversely running transporting conveyor and including a rail extending parallel to the transporting conveyor and wheeled means on the discharge end portion of the sectional conveyor having wheels running along said rail;
driven wheels adjacent to the discharge end of the sectional conveyor;
another set of driven wheels adjacent to the opposite end of the sectional conveyor;
electrical control means for the wheel driving means;
said wheeled means comprising a sensor for deviations from the squared up relation of the sectional conveyor to the transporting conveyor; and
electrical control switch means operated by said sensor to control operation of said sets of driven wheels.

20. Apparatus according to claim 19, in which said wheeled means include an outrigger boom, means pivotally supporting the boom, and means for raising and lowering the boom.

21. Apparatus for moving loose material, comprising;

a ground running machine for removing successive swaths of material from a material source and after each swath removal leaving a face along the material source;

an elongated automotive conveyor in cooperating but noncoupled relation to said machine and equipped with running gear and extending parallel to and spaced from said face with said machine operative to run in a parallel path therebetween;

means for operating said running gear to shift the conveyor to maintain a substantially predetermined spaced relation to each successive face as material is removed by said machine; and means controlled from said machine for controlling said operating means to effect the shifting of the conveyor.

22. Apparatus according to claim 21, including a system for maintaining alignment of said machine relative to said conveyor.

23. Apparatus for moving loose material, comprising:

a ground running machine for removing successive swaths of material from a material source and after each swath removal leaving a face along the material source;

an elongated automotive conveyor in cooperating but noncoupled relation to said machine and equipped with running gear and extending parallel to and spaced from said face with said machine operative to run in a parallel path therebetween;

means for operating said running gear to shift the conveyor to maintain a substantially predetermined spaced relation to each successive face as material is removed by said machine; and a system for maintaining alignment of said machine relative to said conveyor comprising a sighting system for an operator in said machine.

24. Apparatus according to claim 23, in which said sighting system comprises a spaced series of masts on said conveyor having cantilever arms extending over the machine, and respective swath removal and transverse guide lines carried by said arms over the path along which said machine travels along the material source, and sighting rods on the machine to be aligned with said lines selectively by the operator of the machine.

25. Apparatus according to claim 23, said sighting system including means carried in part by said machine and in part by said conveyor.

26. In apparatus of the character described;

a conveyor comprising a plurality of articulated frame sections connected in end-to-end relation;

a continuous single endless conveyor belt carried by and extending along all of said frame sections;

a respective set of running wheels supporting each of said sections;

means for driving certain of said wheels to move the conveyor as a unit;

means operative to control said wheel driving means to drive said certain wheels to advance the conveyor in a direction transverse to its axis in coordinated relation with apparatus for loading material onto the conveyor at any section and movable in a material removing swath along a material source in a path parallel to the conveyor;

automatic timing means to control said wheel driving means to effect said advance of the conveyor automatically a predetermined distance and then stopping the same; and means for activating the timing means.

27. Apparatus according to claim 26, including means for steering the driven wheels in a manner to maintain the conveyor sections in substantially straight alignment.

28. Apparatus according to claim 26, including means for operating said driving means to effect running movement of the conveyor, including longitudinal movement, from one location to another, and means to control said driving means for timed advancing of the conveyor relative to a loading machine and relative to the face of a material source from which material is removed for loading onto the conveyor.

29. Apparatus according to claim 26, adapted for ground running of the wheels, and comprising means for connecting the sections of the conveyor for articulated movement relative to one another in an up-and-down direction while the conveyor is in movement on said wheels, but maintaining the sections against horizontal misalignment during such movement.

30. Apparatus according to claim 26, including hydraulic steering means to effect selective steering turning of selected wheels, and means carried by the conveyor for operating said steering means.

31. Apparatus according to claim 26, in which said belt discharges at one end of the conveyor, and guiding means on said one end of the conveyor for running the conveyor transversely to its axis in squared up normal discharging relation to a transporting conveyor running on an axis transverse to said conveyor belt.

32. In apparatus of the character described:

a conveyor comprising a plurality of sections connected in end-to-end relation and each having a frame;

an endless conveyor belt system carried by said sections;

a respective set of running wheels supporting each said sections;

means for driving certain of said wheels to move the conveyor as a unit;

said wheels having pneumatic tires; and fixed depending deflation legs mounted on at least one frame in association with certain of the wheels and having respective ground-engageable pad feet spaced above ground level when the tires are fully inflated and effective to limit descent of the conveyor upon partial tire deflation.

* * * * *

UNITED STATES PATENT OFFICE
CERTIFICATE OF CORRECTION

Patent No. 3,625,339  Dated December 7, 1971

Inventor(s) Fred T. Smith

It is certified that error appears in the above-identified patent and that said Letters Patent are hereby corrected as shown below:

Col. 5, line 71, after the period ".", read --When the conveyor belt 47 is to be slackened, the hydraulic actuator is extended as shown in FIG. 13.--

Col. 6, line 61, after "a" read --predetermined time interval during which the conveyor is advanced the--.

Col. 7, line 56, after "conveyor" ready --lag behind the tail end portion, the boom 119 swings away from the conveyor--.

Signed and sealed this 15th day of May 1973.

(SEAL)
Attest:

EDWARD M. FLETCHER, JR.
Attesting Officer

ROBERT GOTTSCHALK
Commissioner of Patents